United States Patent
Tseng

(10) Patent No.: US 10,506,276 B2
(45) Date of Patent: *Dec. 10, 2019

(54) DISPLAYING MEDIA ACTION BUTTONS BASED ON MEDIA AVAILABILITY AND SOCIAL INFORMATION

(71) Applicant: Facebook, Inc., Menlo Park, CA (US)

(72) Inventor: Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 381 days.

This patent is subject to a terminal disclaimer.

(21) Appl. No.: 15/202,064

(22) Filed: Jul. 5, 2016

(65) Prior Publication Data
US 2016/0316255 A1 Oct. 27, 2016

Related U.S. Application Data

(63) Continuation of application No. 13/945,538, filed on Jul. 18, 2013, now Pat. No. 9,413,795.

(51) Int. Cl.
*G06F 3/048* (2013.01)
*H04N 21/431* (2011.01)
*H04L 29/06* (2006.01)
*G06Q 50/00* (2012.01)
*G06Q 10/10* (2012.01)
(Continued)

(52) U.S. Cl.
CPC ....... *H04N 21/4312* (2013.01); *G06F 3/0482* (2013.01); *G06Q 10/10* (2013.01); *G06Q 50/01* (2013.01); *H04L 65/403* (2013.01); *H04N 21/4383* (2013.01); *H04N 21/4821* (2013.01); *G06Q 30/0241* (2013.01)

(58) Field of Classification Search
CPC .......... H04N 21/00; G06F 3/048; G06F 3/00; G06Q 50/00; G06Q 50/01
See application file for complete search history.

(56) References Cited

U.S. PATENT DOCUMENTS 6,557,042 B1 * 4/2003 He .................... G06Q 30/02
709/231
8,572,129 B1 10/2013 Lee
(Continued)

FOREIGN PATENT DOCUMENTS

KR 10-2013-0054098 5/2013
WO WO 2012/056326 5/2012
WO WO 2012073027 A2 6/2012

OTHER PUBLICATIONS

Korean IP Office; KR Notice of Allowance, and English Translation of Notice of Allowance, dated Apr. 27, 2017 (Apr. 27, 2017); Applicant code: 520060109587 (foreign 079894.3724).
(Continued)

*Primary Examiner* — Hugo Molina
(74) *Attorney, Agent, or Firm* — Baker Botts L.L.P.

(57) ABSTRACT

In one embodiment, a method includes determining available media content from one or more content sources, providing at least a portion of the available media content for display on a display device of a user, and determining whether a media action button should be displayed on the display device. The media action button is provided for display on the display device when it is determined that the media action button should be displayed. The media action button is operable to perform an action associated with particular available media content.

9 Claims, 6 Drawing Sheets

(51) Int. Cl.
*G06F 3/0482* (2013.01)
*H04N 21/438* (2011.01)
*H04N 21/482* (2011.01)
*G06Q 30/02* (2012.01)

(56) References Cited

U.S. PATENT DOCUMENTS

| | | | | |
|---|---|---|---|---|
| 9,159,313 B2* | 10/2015 | Saeki | | G10L 13/08 |
| 2005/0203853 A1* | 9/2005 | Yamamoto | | G11B 20/00086 |
| | | | | 705/59 |
| 2008/0276269 A1* | 11/2008 | Miller | | G06Q 30/02 |
| | | | | 725/34 |
| 2009/0138505 A1 | 5/2009 | Purdy | | |
| 2011/0107374 A1* | 5/2011 | Roberts | | H04N 5/44543 |
| | | | | 725/46 |
| 2011/0246908 A1* | 10/2011 | Akram | | H04N 21/234318 |
| | | | | 715/752 |
| 2011/0282759 A1 | 11/2011 | Levin | | |
| 2011/0283320 A1 | 11/2011 | Levin | | |
| 2011/0296456 A1 | 12/2011 | Pandala | | |
| 2012/0047529 A1 | 2/2012 | Schultz | | |
| 2012/0054777 A1* | 3/2012 | Xiques | | G06Q 30/0277 |
| | | | | 719/318 |
| 2012/0110064 A1 | 5/2012 | Chen | | |
| 2012/0110464 A1 | 5/2012 | Chen et al. | | |
| 2012/0174157 A1* | 7/2012 | Stinson, III | | H04N 5/44543 |
| | | | | 725/40 |
| 2012/0203838 A1 | 8/2012 | Zuckerberg et al. | | |
| 2013/0086159 A1* | 4/2013 | Gharachorloo | | G06Q 50/01 |
| | | | | 709/204 |
| 2013/0114940 A1 | 5/2013 | Merzon | | |
| 2013/0159403 A1 | 6/2013 | Zigoris | | |
| 2013/0212606 A1* | 8/2013 | Kannan | | H04N 21/4667 |
| | | | | 725/12 |
| 2013/0291037 A1* | 10/2013 | Im | | H04N 21/4788 |
| | | | | 725/109 |
| 2014/0006951 A1* | 1/2014 | Hunter | | H04H 60/31 |
| | | | | 715/719 |
| 2014/0088741 A1* | 3/2014 | Molesky | | G09B 21/006 |
| | | | | 700/94 |
| 2014/0172622 A1 | 6/2014 | Baronshin | | |
| 2014/0282092 A1* | 9/2014 | Riddell | | H04L 65/4015 |
| | | | | 715/753 |
| 2015/0026596 A1 | 1/2015 | Tseng | | |
| 2015/0088891 A1 | 3/2015 | Funk | | |

OTHER PUBLICATIONS

PCT Notification of Transmittal of the International Search Report and the Written Opinion of the International Searching Authority, or the Declaration for International application No. PCT/US2014/047007, dated Nov. 13, 2014.
Erick Tseng, U.S. Appl. No. 13/945,538, Non-Final Rejection, dated Sep. 28, 2015.
Erick Tseng, U.S. Appl. No. 13/945,538, Response to Non-Final Rejection, dated Jan. 28, 2016.
Erick Tseng, U.S. Appl. No. 13/945,538, Applicant Initiated Interview Summary, dated Feb. 9, 2016.
Erick Tseng, U.S. Appl. No. 13/945,538, Examiner Initiated Interview Summary, dated Apr. 4, 2016.
Erick Tseng, U.S. Appl. No. 13/945,538, Notice of Allowance, dated Apr. 4, 2016.
KR Office Action received from KIPO for Patent Application No. 10-2017-7021137. (with English Translation), dated Aug. 14, 2019.

* cited by examiner

DISPLAYING MEDIA ACTION BUTTONS BASED ON MEDIA AVAILABILITY AND SOCIAL INFORMATION

RELATED APPLICATIONS

This application is a continuation application under 35 U.S.C. § 120 of U.S. application Ser. No. 13/945,538, filed Jul. 18, 2013, and entitled "METHOD AND SYSTEM FOR PROVIDING MEDIA ACTION BUTTONS FOR VIEWING MEDIA CONTENT," which is incorporated herein by reference in its entirety.

TECHNICAL FIELD

This disclosure generally relates to social networking and more specifically to providing media action buttons.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments enhance a user's media viewing experience by providing media action buttons which may be displayed in, for example, a programming guide on a mobile device, a personal computer, or any other display device. A media action button is any selectable user option on a graphical user interface that, when selected, causes an action associated with media content such as movies and TV shows to be performed. The actions may include, for example, watching the associated media content or sending instructions to another device to switch to a channel in order to view the associated media content. The media action buttons provide an enhanced user experience by only appearing when the associated media content is available to watch.

In certain embodiments, media action buttons provide a visual indication of whether media content is currently available to watch. For example, a media action button may not be visible at all or may be altered (e.g., grayed-out) when a particular TV show is not currently available to watch on TV. In some embodiments, media action buttons may provide a visual indication of whether media content is currently being watched by one or more connections of the user. For example, a media action button with a particular appearance may appear when a movie is currently available to watch and one or more friends of the user are also currently watching the movie. In some embodiments, media action buttons may provide a visual indication of whether media content has been "liked" by one or more connections of the user. For example, a media action button with a particular appearance may appear when a movie is currently available to watch and one or more friends of the use have "liked" the movie.

DESCRIPTION OF EXAMPLE EMBODIMENTS

Figure 1:
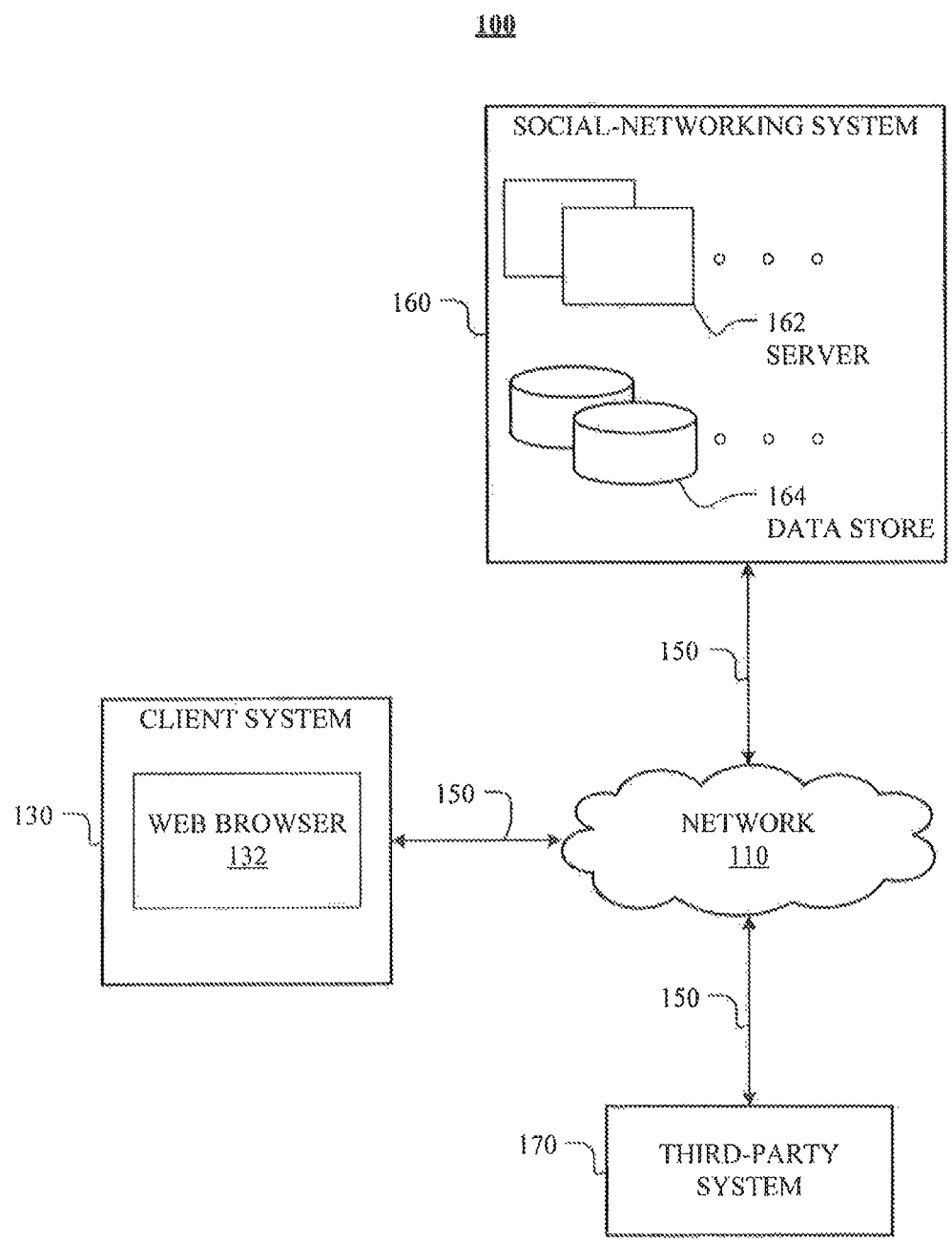
FIG. 1 illustrates an example network environment associated with a social-networking system, according to certain embodiments.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
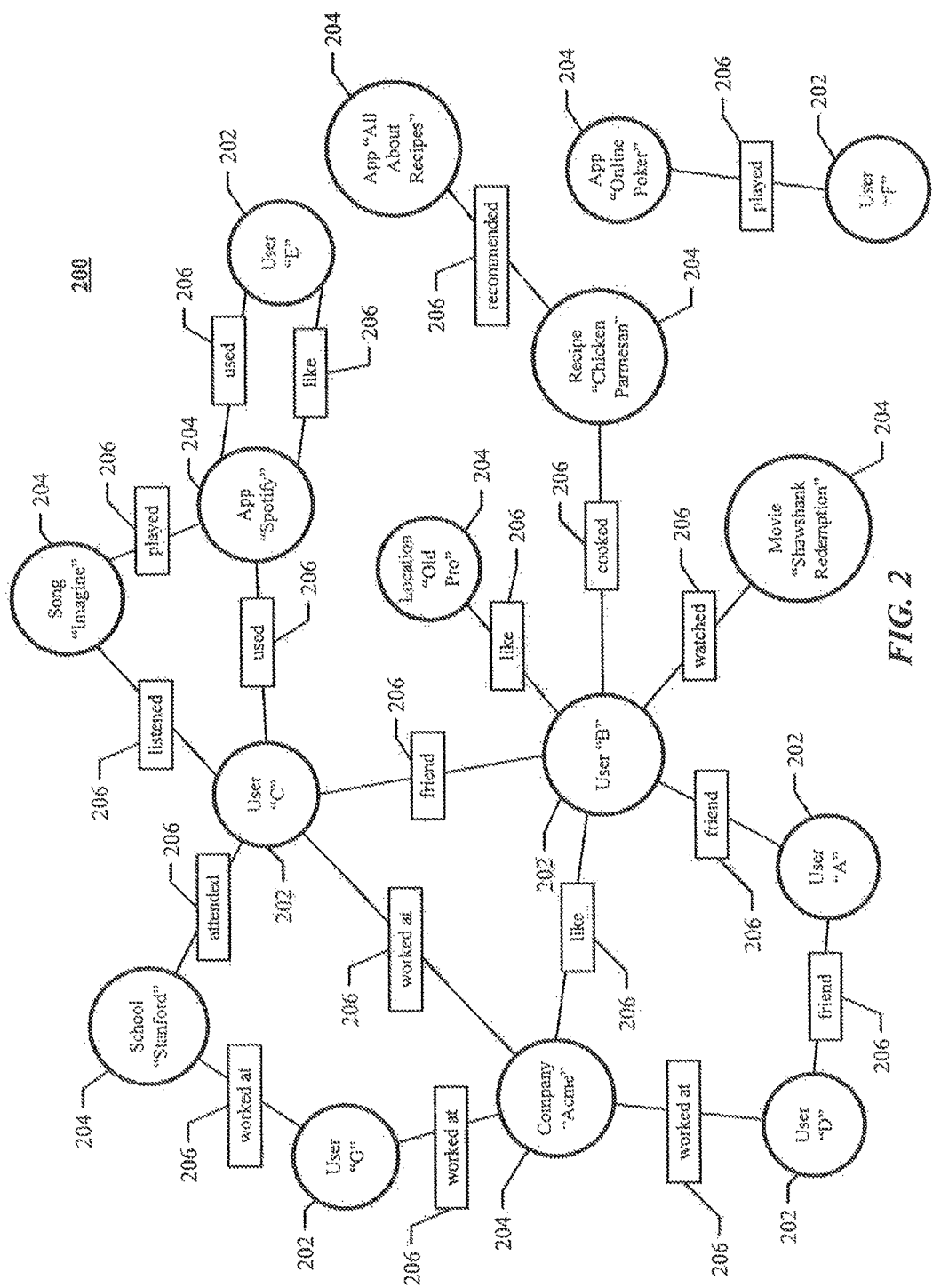
FIG. 2 illustrates an example social graph, according to certain embodiments.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system context directed to the user. As an example and not by way of limitation, an advertisement may display information about a friend of the user within social-networking system 160 who has taken an action associated with the subject matter of the advertisement.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Figure 3:
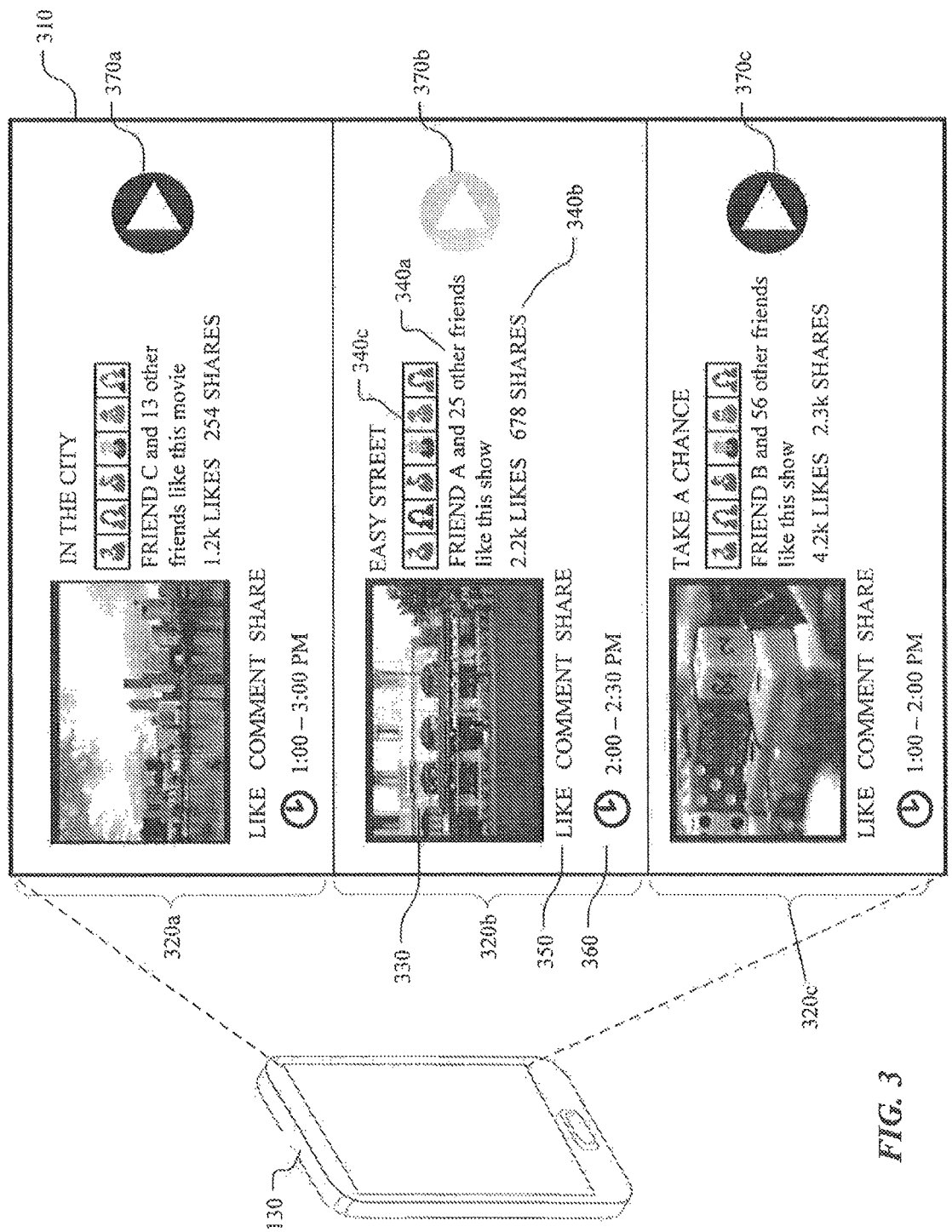
FIG. 3 illustrates an example programming guide that includes media action buttons, according to certain embodiments.

FIG. 3 illustrates an example programming guide 310 which may be displayed on mobile device 130 or any other client system 130. In some embodiments, programming guide 310 is generated by social-networking system 160 using social graph 200 and is a personalized set of available media content to display to a user. For example, programming guide 310 may include media content that is available to the user along with social content related to the user and the media content.

In general, programming guide 310 provides an easy and convenient way for a user to view and select available content to display on any client system 130. In some embodiments, programming guide 310 may aggregate content from multiple sources (e.g., over-the-top (OTT) content provider such as NetFlix, Hulu, Amazon Video, and YouTube, multiple system operators (MSO) such as Comcast, Time Warner, AT&T U-verse, and Dish Network, on-demand programming, DVRs, third-party internet sites, other cable provides, etc.) into a convenient list of available media content according to the user's interests. The user is not required to know where the content is being sourced from or what channel is associated with the content. Instead, the user may simply tap a media action button 370 for an available program in programming guide 310 and the show will be displayed on any client system 130. For example, a selected show may be displayed on the user's smart phone or a TV of the user.

Programming guide 310 may include any available content that may be viewed on any client system 130. For example, programming guide 310 may include content from MSOs that would typically be selected using a set-top box (STB). Programming guide 310 may also include content from an OTT provider such as Hulu and Netflix. Content in programming guide 310 may also be on-demand content and may include an indication of the price to view the on-demand content. In some embodiments, programming guide 310 may be displayed on mobile device 130 using, for example, a mobile app of social-networking system 160.

Programming guide 310 includes programming guide entries 320 (e.g., programming guide entries 320a-c in this example). Each programming guide entry 320 may include a media content image 330, social content 340, one or more user selectable options 350, airing time 360, and media action button 370. Social content 340 of each programming guide entry 320 is related to the media content of programming guide entry 320 and is generated by social-networking system 160 using social graph 200.

Media content image 330 may be any image or graphic associated with the media content of programming guide entry 320. In some embodiments, media content image 330 may be an image captured from video associated with the media of programming guide entry 320. For example, media content image 330a may be an image captured from the movie "In the City" of programming guide entry 320a. In some embodiments, media content image 330 may be a cover image provided by an entity associated with the media content of programming guide entry 320. For example, if a particular movie studio produced the movie "In the City" of programming guide entry 320, the movie studio may provide or otherwise indicate to social-networking system 160 a particular image to use as a cover image for the movie. Social-networking system 160 may then access the cover image and use it as media content image 330a to represent the movie in programming guide 310.

Social content 340 is any social content associated with the media content of programming guide entry 320 that is determined by social-networking system 160 from social graph 200. In some embodiments, social content 340 may include an indication of how many other users of social-networking system 160 have viewed, "liked," shared, or posted comments about the media content of programming guide entry 320. As a specific example, consider the example programming guide entry 320b of FIG. 3. In this example, the media content of programming guide entry 320b is a TV show called "Easy Street." Social-networking system 160 may query social graph 200 and determine that twenty six of the user's friends have "liked" the TV show "Easy Street." Social content 340a of programming guide entry 320b, which reads "FRIEND A and 25 other friends like this show" may then be generated and displayed proximate to media content image 330b for "Easy Street." In another example, social-networking system 160 may query social graph 200 and determine that over 2,200 other users have "liked" "Easy Street" and that 678 other users have shared "Easy Street." Social content 340b, which reads "2.2 k LIKES 678 SHARES" may then be generated and displayed proximate to media content image 330b for "Easy Street." In some embodiments, social content 340 may also include a facepile 340c. Facepile 340c may include, for example, images, icons, or avatars of other users (e.g., friends) of social-networking system 160 who have liked the media content of programming guide entry 320, as determined using social graph 200.

User-selectable options 350 are any options that permit a user to perform one or more actions associated with programming guide entry 320. For example, user-selectable options 350 may include options that the user may select to indicate that he "likes" the media content of programming guide entry 320, to comment about the media content of programming guide entry 320, and to share the media content of programming guide entry 320. Once selected, user selectable-options 350 may cause any appropriate action within social-networking system 160. For example, if a user selects user selectable-option 350 to "like" the media content of programming guide entry 320b (i.e., "Easy Street"), an edge 206 may be added to social graph 200 to indicate that the user "likes" "Easy Street." As another example, if a user selects user selectable-option 350 to "share" "Easy Street," a post may appear in the user's friends' newsfeed indicating that the user has shared "Easy Street."

In some embodiments, user selectable options 350 may include other options such as remind and record. For example, "REMIND" may be included as a user selectable option 350 in programming guide entry 320 and may cause, once selected by a user, a notification to be sent to the user when the media content of programming guide entry 320 is about to begin. As another example, "RECORD" may be included as a user selectable option 350 in programming guide entry 320 and may cause, once selected by a user, instructions to be sent to another device such as a DVR to record the media content of programming guide entry 320. In some embodiments, a primary action may also be established for each programming guide entry 320 (e.g., watch again, watch, record, etc.) using user selectable options 350.

Airing time 360 is any indication of the times in which the media content of programming guide entry 320 may be viewed. For example, airing time 360 of programming guide entry 320a indicates that the movie "In the City" will begin at 1:00 PM and end at 3:00 PM. As another example, airing time 360 of programming guide entry 320b indicates that the TV show "Easy Street" will begin at 2:00 PM and end at 2:30 PM.

Media action button 370 is any selectable user option on a graphical user interface that, when selected, causes an action associated with media content such as movies and TV shows to be performed. The actions may include, for example, watching the associated media content or sending instructions to another device to switch to a channel in order to view the associated media content. Media action buttons 370 provide an enhanced user experience by only appearing (or only being active) when the associated media content is available to watch.

In certain embodiments, media action button 370 provides a visual indication of whether media content of programming guide entry 320 is currently available to watch. For example, media action button 370 may not be visible at all or may be altered (e.g., grayed-out) when a particular TV show is not currently available to watch on TV. In some embodiments, media action button 370 may provide a visual indication of whether media content of programming guide entry 320 is currently being watched by one or more connections of the user. For example, a media action button 370 with a particular appearance may appear when a movie is currently available to watch and one or more friends of the user (or a particular number of the user's friends) are also currently watching the movie. In some embodiments, media action button 370 may provide a visual indication of whether media content of programming guide entry 320 has been "liked" by one or more connections of the user. For example, a media action button 370 with a particular appearance may appear when a movie is currently available to watch and one or more friends of the user (or a particular number of the user's friends) have "liked" the movie. In some embodiments, media action buttons 370 may include any iconography and/or text to indicate how the media content of programming guide entry 320 will be played back. For example, media action buttons 370 may include any indication that clicking the media action button will result in a TV channel change. As another example, media action buttons 370 may include any indication that clicking the media action button will launch a mobile app and stream the content (e.g., via Hulu, Netflix, Amazon, etc.) or that clicking the media action button will take the user into a DVR or an on-demand catalog. In some embodiments, media action buttons 370 may include any indication such as a "$" sign to indicate payment will be require in order to watch media content of programming guide entry 320. Particular embodiments of media action button 370 are illustrated in FIG. 4 and discussed below.

Media action button 370, when selected by a user, may perform any appropriate action related to the media content of programming guide entry 320. In some embodiments, media action button 370 may send any appropriate instructions to begin playing the particular media content of programming guide entry 320 when selected. For example, the user may select media action button 370 on the user's smart phone to being viewing the particular media content of programming guide entry 320 on the user's smart phone. In some embodiments, media action button 370 may send any appropriate instructions to cause another device to change to a channel in which the particular media content of programming guide entry 320 may be viewed. For example, the user may select media action button 370 on the user's smart phone to being viewing the particular media content of programming guide entry 320 on the user's TV. In this scenario, the media action button 370 causes instructions to be sent to, for example, an STB in order to tune the STB to the appropriate channel to view the particular media content of programming guide entry 320.

Figure 4:
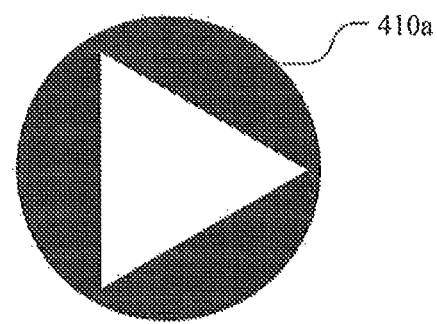
FIG. 4 illustrates example media action buttons, according to certain embodiments.
Figure 4:
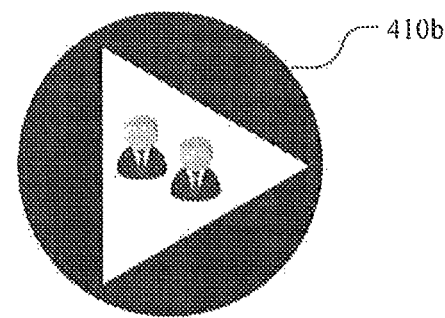
Figure 4:
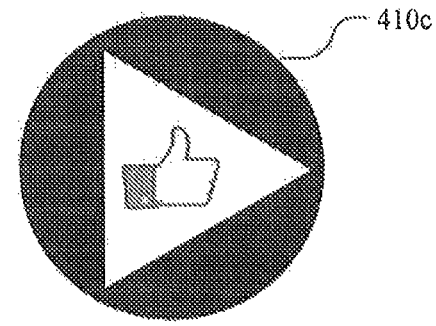

FIG. 4 illustrates example media action buttons 410 which may be used as media action buttons 370. Media action button 410a is an embodiment which may be used to indicate whether particular media content is currently available for viewing. For example, media action button 410a may appear in programming guide entry 320 when the TV show or movie of the programming guide entry 320 is currently available to view (e.g., it is currently 1:00 PM and the TV show of programming guide entry 320 airs between 1:00 and 1:30 PM). In some embodiments, media action button 410a may be not appear in programming guide entry 320 until the particular media content of programming guide entry 320 is available to watch. In other embodiments, media action button 410a may be grayed-out or otherwise altered until the particular media content of programming guide entry 320 is available to watch.

Media action button 410b is an embodiment which may be used to indicate whether particular media content is currently being watched by one or more connections of the user. For example, media action button 410b may appear in programming guide entry 320 when the TV show or movie of the programming guide entry 320 is currently available to view and the TV show or movie is currently being watched by one or more friends of the user. In some embodiments, media action button 410b may include one or more pictures or images associated with users as illustrated in FIG. 4. In some embodiments, media action button 410b may include text to indicate the TV show or movie is currently being watched by one or more friends of the user. While particular embodiments of media action button 410b have been discussed and illustrated, any appropriate visual indication may be used for media action button 410b to indicate that the media content of programming guide entry 320 is currently being watched by one or more connections of the user.

Media action button 410c is an embodiment which may be used to indicate whether particular media content has been "liked" by one or more connections of the user. For example, media action button 410c may appear in programming guide entry 320 when the TV show or movie of the programming guide entry 320 is currently available to view and the TV show or movie has been "liked" by one or more friends of the user. In some embodiments, media action button 410c may include one or more pictures or images associated with users liking content (e.g., a thumbs-up, an up arrow, etc.) as illustrated in FIG. 4. In some embodiments, media action button 410c may include text to indicate the TV show or movie has been "liked" by one or more friends of the user. While particular embodiments of media action button 410c have been discussed and illustrated, any appropriate visual indication may be used for media action button 410c to indicate that the media content of programming guide entry 320 has been "liked" by one or more connections of the user.

In operation, social-networking system 160 determine available media content from one or more content sources in order to provide programming guide 310. For example, social-networking system 160 may query MSOs, OTTs, or other cable providers to determine media content that is available for a particular user who is in a particular region. In certain embodiments, social-networking system 160 may determine a user's subscription info (e.g., which cable package he is subscribed to) in order to determine available media content for programming guide 310. For example, if the user is subscribed to basic cable from a certain cable provider in a certain city, social-networking system 160 may access a database of known channels and programs for the particular cable provider and city. Social-networking system 160 may then provide the available media content for display in client system 130. In certain embodiments, programming guide 310 displays what is currently on (i.e., what TV shows and movies are currently available to view) as well as TV shows and movies that are coming on soon (e.g., within the half hour, hour, day, week, etc.).

In some embodiments, social-networking system 160 may determine what cable package a user is currently subscribed to by pulling a list of all available packages from a MSO (e.g., basic cable, plus, premium, etc.) using an API and then use a setup wizard questionnaire to determine the user's current subscription. For example, the wizard may ask the user "do you get HBO?" Based on the user's answer, social-networking system 160 may utilize any appropriate logic to determine the user's subscription. For example, if the user answers that he does not get HBO and the list of available packages from the MSO indicates that HBO is available on all packages except for the basic package, social-networking system 160 may determine that the user has basic cable. In some embodiments, if the user indicates that he does not get HBO, social-networking system 160 may determine a list of other channels that the user likely does not get and prompt the user: "We don't think you get these channels either. Do you get these?"

Social-networking system 160 also determines whether a media action button 370 should be displayed in programming guide 310. For example, social-networking system 160 determines whether a media action button 370 should be displayed in each programming guide entry 320. In some embodiments, social-networking system 160 determines whether the media content of programming guide entry 320 is currently available to watch. This may include, for example, comparing the current time to the scheduled airing time of the media content. If it is determined that the current time is within the scheduled airing time, it is determined that the media content is currently available to watch and thus a media action button 370 such as media action button 410a may be presented in the programming guide entry 320. If, however, it is determined that the current time is not within the scheduled airing time, it is determined that the media content is not currently available to watch and thus media action button 370 may be grayed-out in the programming guide entry 320 or may not be presented at all.

In some embodiments, social-networking system 160 determines whether the media content of programming guide entry 320 is currently being watched by one or more connections of the user. For example, social-networking system 160 may query social graph 200 in order to determine whether one or more friends of the user are currently watching the media content of programming guide entry 320. This may be determined, by example, by querying social graph 200 for posts, stories, messages, etc. that are associated with the media content of programming guide entry 320. For example, if the media content of programming guide entry 320 is "Easy Street" and social graph 200 indicates that a friend of the user has recently posted "I'm currently watching Easy Street," social-networking system 160 may determine that the friend of the user is currently watching "Easy Street" and thus cause a media action button 370 such as media action button 410b to be displayed in the programming guide entry 320 for "Easy Street."

In some embodiments, social-networking system 160 determines whether the media content of programming guide entry 320 has been "liked" by one or more connections of the user. For example, social-networking system 160 may query social graph 200 in order to determine whether one or more friends of the user have "liked" the media content of programming guide entry 320. This may be determined, by example, by querying social graph 200 for posts, stories, messages, etc. that are associated with the media content of programming guide entry 320. For example, if the media content of programming guide entry 320 is "Easy Street" and social graph 200 indicates a "like" edge 206 between a friend of the user and "Easy Street," social-networking system 160 may determine that the friend of the user has "liked" "Easy Street" and thus cause a media action button 370 such as media action button 410c to be displayed in the programming guide entry 320 for "Easy Street."

In some embodiments, social-networking system 160 may access user settings to determine how to display media action button 370. For example, if a user's settings indicate that the user wishes to not be notified that the user's friends are watching media content, social-networking system 160 may not display media action button 410b. Instead, social-networking system 160 may simply utilize media action button 410a. As another example, if a user's settings indicate that the user wishes to not be notified that the user's friends have "liked" media content, social-networking system 160 may not display media action button 410c. Instead, social-networking system 160 may simply utilize media action button 410a.

In some embodiments, the media content of programming guide 310 is recommended media content for the user that is determined by social-networking system 160. In general, the recommended media content may be determined based on interests and social context using information from social graph 200. To do so, social-networking system 160 queries social graph 200 for information associated with one or more users of the social-networking system. Once the information from social graph 200 is obtained, social-networking system 160 utilizes the information to determine recommended media content for the user. Determining the recommended media content is discussed in more detail below.

In certain embodiments, social networking system 160 may utilize social coefficients to determine recommended media content for programming guide 310. Some embodiments may utilize coefficients as described in U.S. patent application Ser. No. 12/978,265 entitled "Contextually Relevant Affinity Prediction in a Social Networking System," which is incorporated herein by reference. Social networking system 160 may utilize the following information from social graph 200 in determining coefficients of specific media content for an individual user:

the number of friends of the user who have liked the specific media content the total number of users of social networking system 160 who have liked the specific media content the number of friends of the user who have viewed the specific media content the total number of users of social networking system 160 who have viewed the specific media content a taste algorithm (e.g., users who liked the specific content will also like this other content.)

Social networking system 160 may then combine the information above in order to determine a coefficient associated with the user for each content. For example, consider a scenario in which a query of social graph 200 for a specific media content yielded the following results:

the number of friends of the user who have liked the specific media content=5 the total number of users of social networking system 160 who have liked the specific media content=1000 the number of friends of the user who have viewed the specific media content=2 the total number of users of social networking system 160 who have viewed the specific media content=250

The combination of these example results would yield a coefficient of 5+1000+2+250=1257 for this specific media content for the user. Social networking system 160 then performs similar calculations in order to determine coefficients of other media content for the user. In certain embodiments, the resulting coefficients of all media content are then ranked for the user. A predetermined number of the top-ranked media content may then be presented to the user as recommended media content in programming guide 310.

As discussed above, a taste algorithm may be utilized by social networking system 160 to determine recommended media content for the user. For example, social networking system 160 may first determine first media content that a user watched, liked, or otherwise interacted with on social networking system 160. In some embodiments, the first media content may be determined using social graph 200. Once the first media content has been determined, social networking system 160 may then search social graph 200 to determine other users or friends of the user who also watched, liked, or otherwise interacted with the first media content on social networking system 160. Social networking system 160 may then search social graph 200 for second media content that the determined users or friends watched, liked, or otherwise interacted with on social networking system 160. The determined second media content may then be recommended to the user as recommended media content in programming guide 310. In some embodiments, weighting factors may be utilized in determining what media content to recommend to a user. For example, second media content viewed by a user's friends may have a higher weight in determining recommendations for a user than second media content viewed by users who are not friends.

As an example for illustrative purposes only, consider a scenario where a first user has liked the media content "Garage Talk" in the past. Social networking system 160 may query social graph 200 in order to determine other users or friends of the first user who have also liked "Garage Talk." For example, social networking system 160 may determine that Friend A and User B also liked "Garage Talk." Social networking system 160 may then query social graph 200 for other media content liked by the other users or friends who also liked "Garage Talk." For example, social networking system 160 may determine that Friend A and User B, who liked "Garage Talk," also liked "Shop Journal" and "Cars Galore." Social networking system 160 may then display "Shop Journal" and "Cars Galore" as recommended media content to the first user in programming guide 310. If, for example, Friend A liked "Shop Journal" and User B (who is not a friend of the first user) liked "Cars Galore," then "Shop Journal" may appear higher in programming guide 310 than "Shop Journal."

In certain embodiments, social networking system 160 may determine trending media content or their associated media content to display as recommended media content in programming guide 310. For example, social networking system 160 may analyze posts, likes, or any other interaction with social networking system 160 in order to determine media content that is trending. Media content that is trending may be, for example, content that has received the most "likes" or views within a predetermined period. Social networking system 160 may then include one or more trending media content as recommended media content in programming guide 310.

Figure 5:
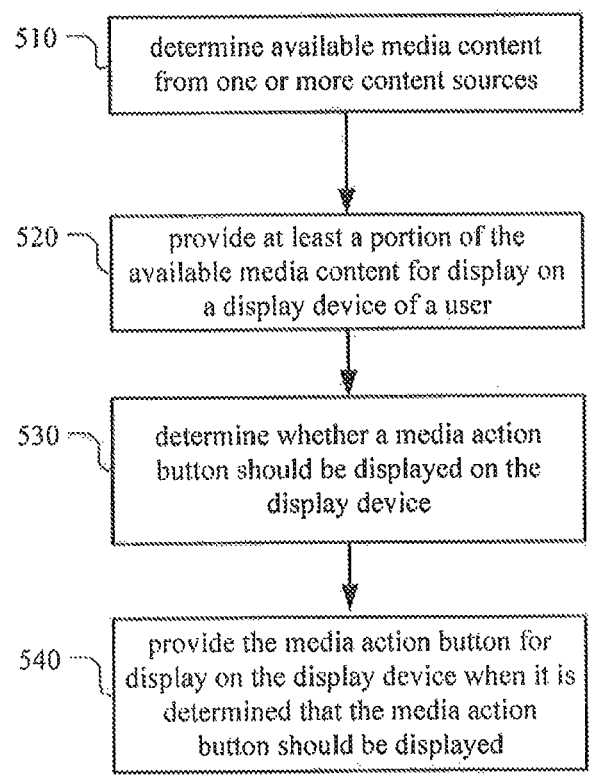
FIG. 5 illustrates an example method for providing media action buttons, according to certain embodiments.

FIG. 5 illustrates an example method 500 for providing media action buttons. The method may begin at step 510, where available media content is determined from one or more content sources. In some embodiments, the media content includes TV shows and movies. In some embodiments, the available media content includes TV shows and movies that are available from a MSO, OTT, or any other provider as described above. In some embodiments, the available media content is any TV show or movie that is currently airing or will be airing in the near future (e.g., in the next half hour, hour, day, week, etc.). In some embodiments, the available media content is determined as described above.

In step 520, at least a portion of the available media content from step 510 is provided for display on a display device of a user. In some embodiments, the display device is a smart phone, TV, or any other client system 130. In some embodiments, step 520 includes providing at least a portion of the available media content for display in a programming guide such as programming guide 310. In some embodiments, the available media content is displayed in programming guide entries such as programming guide entries 320.

In step 530, it is determined whether a media action button should be displayed on the display device. In some embodiments, the media action button is media action button 370 describe above. In some embodiments, step 530 includes determining whether the particular available media content is currently available to watch. In some embodiments, step 530 includes determining whether the available media content is currently being watched by one or more connections of the user. In some embodiments, step 530 includes determining whether the available media content has been liked by one or more connections of the user.

In step 540, the media action button is provided for display on the display device when it is determined in step 530 that the media action button should be displayed. In some embodiments, the media action button may include a visual indication of whether the available media content is currently available to watch. For example, if it is determined in step 530 that a particular TV show or movie is currently playing, step 540 may include providing a media action button such as media action button 410a for display to the user. In some embodiments, the media action button includes a visual indication of whether the available media content is currently being watched by the one or more connections of the user. For example, if it is determined in step 530 that a particular TV show or movie is currently playing and that the TV show or movie is currently being watched by a friend of the user, step 540 may include providing a media action button such as media action button 410b for display to the user. In certain embodiments, the media action button includes a visual indication of whether the available media content has been liked by one or more connections of the user. For example, if it is determined in step 530 that a particular TV show or movie is currently playing and that the particular TV show or movie has been "liked" by at least one friend of the user, step 540 may include providing a media action button such as media action button 410*c* for display to the user. In some embodiments, the media action button is operable to perform an action associated with particular available media content. In some embodiments, the action associated with particular available media content may be sending instructions to begin playing the particular available media content or sending instructions to tune another device to a channel in which the particular available media content may be viewed.

In some embodiments, method 500 may additionally include querying a social graph of the social-networking system for social content associated with the available media content and one or more users of the social-networking system. In some embodiments, the social graph is social graph 200 and includes a plurality of nodes and edges connecting the nodes, the nodes comprising user nodes that are each associated with a particular user of the social-networking system. Method 500 may also include providing at least a portion of the queried social content from the social graph for display along with the available media content on the display device. In some embodiments, the social content is one or more of an indication of a number of other users of the social-networking system who have viewed the available media content, an indication of a number of other users of the social-networking system who have "liked" the available media content, an indication of a number of other users of the social-networking system who have shared the available media content, an indication of a number of comments about the available media content, or a facepile.

In some embodiments, method 500 may include determining, using social content from social graph 200 and the available media content determined in step 510, a plurality of social coefficients for the user. The social coefficients may then be used to determine recommended media content for the user. At least a portion of the recommended media content may then be provided for display on the display device.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
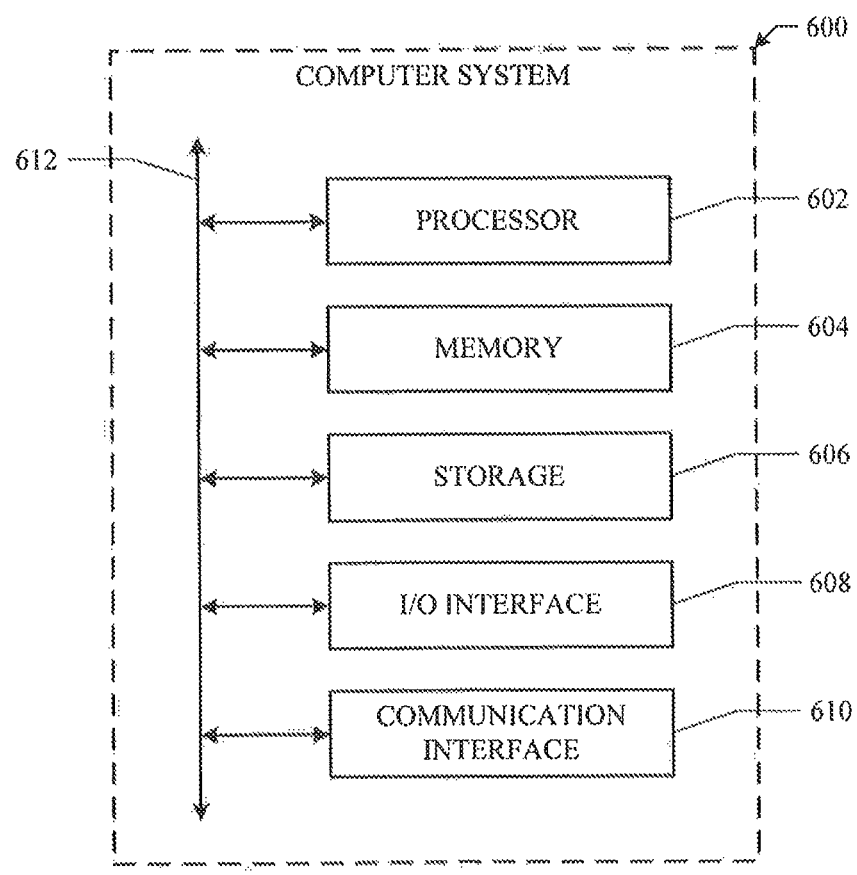
FIG. 6 illustrates an example computer system, according to certain embodiments.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM).

Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
providing, by one or more computer systems, a first media action button for display on a display device when it is determined that particular media content is currently available for viewing;
determining by the one or more computer systems, based on a social graph, that one or more connections of a user are currently watching the particular media content;
providing, by the one or more computer systems, a second media action button for display on the display device when it is determined that the particular media content is currently available for viewing and is currently being watched by the one or more connections of the user as determined from the social graph, the second media action button comprising a visual indication that the particular media content is currently being watched by the one or more connections of the user;
determining by the one or more computer systems, based on the social graph, that one or more other connections of the user have liked the particular media content;
providing, by the one or more computer systems, a third media action button for display on the display device when it is determined that the particular media content is currently available for viewing and has been liked by at least one of the one or more other connections of the user as determined from the social graph, the third media action button comprising a visual indication that the particular media content has been liked by at least one of the one or more other connections of the user; and
providing, by the one or more computer systems, a programming guide for display on the display device, the programming guide comprising a plurality of entries, each entry associated with respective media content;
wherein:
the first, second, and third media action buttons, when provided, are displayed within the programming guide;
the first, second, and third media action buttons are visually different from each other; and
the first, second, and third media action buttons are grayed-out when the particular media content is currently not available for viewing.

2. The method of claim 1, wherein the first, second, and third media action buttons, when provided, each comprise a visual indication of whether the particular media content is currently available to watch.

3. The method of claim 1, wherein the first, second, and third media action buttons, are each operable, when selected, to:
send instructions to begin playing the particular media content on the display device or another device; or
send instructions to tune another device to a channel in which the particular media content may be viewed.

4. One or more computer-readable non-transitory storage media in one or more computing systems, the media embodying logic that is operable when executed to:
provide a first media action button for display on a display device when it is determined that particular media content is currently available for viewing;
determine, based on a social graph, that one or more connections of a user are currently watching the particular media content;
provide a second media action button for display on the display device when it is determined that the particular media content is currently available for viewing and is currently being watched by the one or more connections of the user as determined from the social graph;
determine, based on the social graph, that one or more other connections of the user have liked the particular media content, the second media action button comprising a visual indication that the particular media content is currently being watched by the one or more connections of the user;
provide a third media action button for display on the display device when it is determined that the particular media content is currently available for viewing and has been liked by at least one of the one or more other connections of the user as determined from the social graph, the third media action button comprising a visual indication that the particular media content has been liked by at least one of the one or more other connections of the user; and provide a programming guide for display on the display device, the programming guide comprising a plurality of entries, each entry associated with respective media content;

wherein:

the first, second, and third media action buttons, when provided, are displayed within the programming guide;

the first, second, and third media action buttons are visually different from each other; and the first, second, and third media action buttons are grayed-out when the particular media content is currently not available for viewing.

5. The one or more computer-readable non-transitory storage media of claim 4, wherein the first, second, and third media action buttons, when provided, each comprise a visual indication of whether the particular media content is currently available to watch.

6. The one or more computer-readable non-transitory storage media of claim 4, wherein the first, second, and third media action buttons, are each operable, when selected, to:

send instructions to begin playing the particular media content on the display device or another device; or send instructions to tune another device to a channel in which the particular media content may be viewed.

7. A system comprising:

one or more processors; and a memory coupled to the one or more processors, the memory comprising instructions executable by the one or more processors, the one or more processors being operable when executing the instructions to:

provide a first media action button for display on a display device when it is determined that particular media content is currently available for viewing;

determine, based on a social graph, that one or more connections of a user are currently watching the particular media content;

provide a second media action button for display on the display device when it is determined that the particular media content is currently available for viewing and is currently being watched by the one or more connections of the user as determined from the social graph, the second media action button comprising a visual indication that the particular media content is currently being watched by the one or more connections of the user;

determine, based on the social graph, that one or more other connections of the user have liked the particular media content;

provide a third media action button for display on the display device when it is determined that the particular media content is currently available for viewing and has been liked by at least one of the one or more other connections of the user as determined from the social graph, the third media action button comprising a visual indication that the particular media content has been liked by at least one of the one or more other connections of the user; and provide a programming guide for display on the display device, the programming guide comprising a plurality of entries, each entry associated with respective media content;

wherein:

the first, second, and third media action buttons, when provided, are displayed within the programming guide;

the first, second, and third media action buttons are visually different from each other; and the first, second, and third media action buttons are grayed-out when the particular media content is currently not available for viewing.

8. The system of claim 7, wherein the first, second, and third media action buttons, when provided, each comprise a visual indication of whether the particular media content is currently available to watch.

9. The system of claim 7, wherein the first, second, and third media action buttons, are each operable, when selected, to:

send instructions to begin playing the particular media content on the display device or another device; or send instructions to tune another device to a channel in which the particular media content may be viewed.

* * * * *